United States Patent

[11] 3,614,026

| [72] | Inventors | Louis N. Montanino<br>Tonawanda;<br>William E. Pearson, E. Amherst, both of N.Y. |
|---|---|---|
| [21] | Appl. No. | 821,167 |
| [22] | Filed | Apr. 29, 1969 |
| [45] | Patented | Oct. 19, 1971 |
| [73] | Assignee | The United States of America as represented by the Secretary of the Air Force |

[54] SELF-SUSTAINED ATTITUDE CONTROL SYSTEM
4 Claims, 1 Drawing Fig.

[52] U.S. Cl. .................................................. 244/3.22
[51] Int. Cl. ...................................................... F42b 15/18
[50] Field of Search .......................................... 244/3.22; 60/229, 267

[56] References Cited
UNITED STATES PATENTS

| 2,726,510 | 12/1955 | Goddard | 244/3.22 X |
| 2,943,822 | 7/1960 | Hamilton | 244/3.22 X |
| 3,197,959 | 8/1965 | Keller | 244/3.22 X |
| 3,241,310 | 3/1966 | Hoadley | 60/267 |
| 3,350,886 | 11/1967 | Feraud et al. | 244/3.22 |

*Primary Examiner*—Verlin R. Pendegrass
*Attorneys*—Harry A. Herbert, Jr. and Jacob N. Erlich

ABSTRACT: A self-sustained attitude control system having a propellant tank, a pump, a heat source and an accumulator. The accumulator stores the superheated vapors expelled from the heat exchanger after being pumped therethrough. The superheated vapors released from said accumulator are used for (1) attitude control, (2) actuation of the pump, and (3) as the heat source in the heat exchanger.

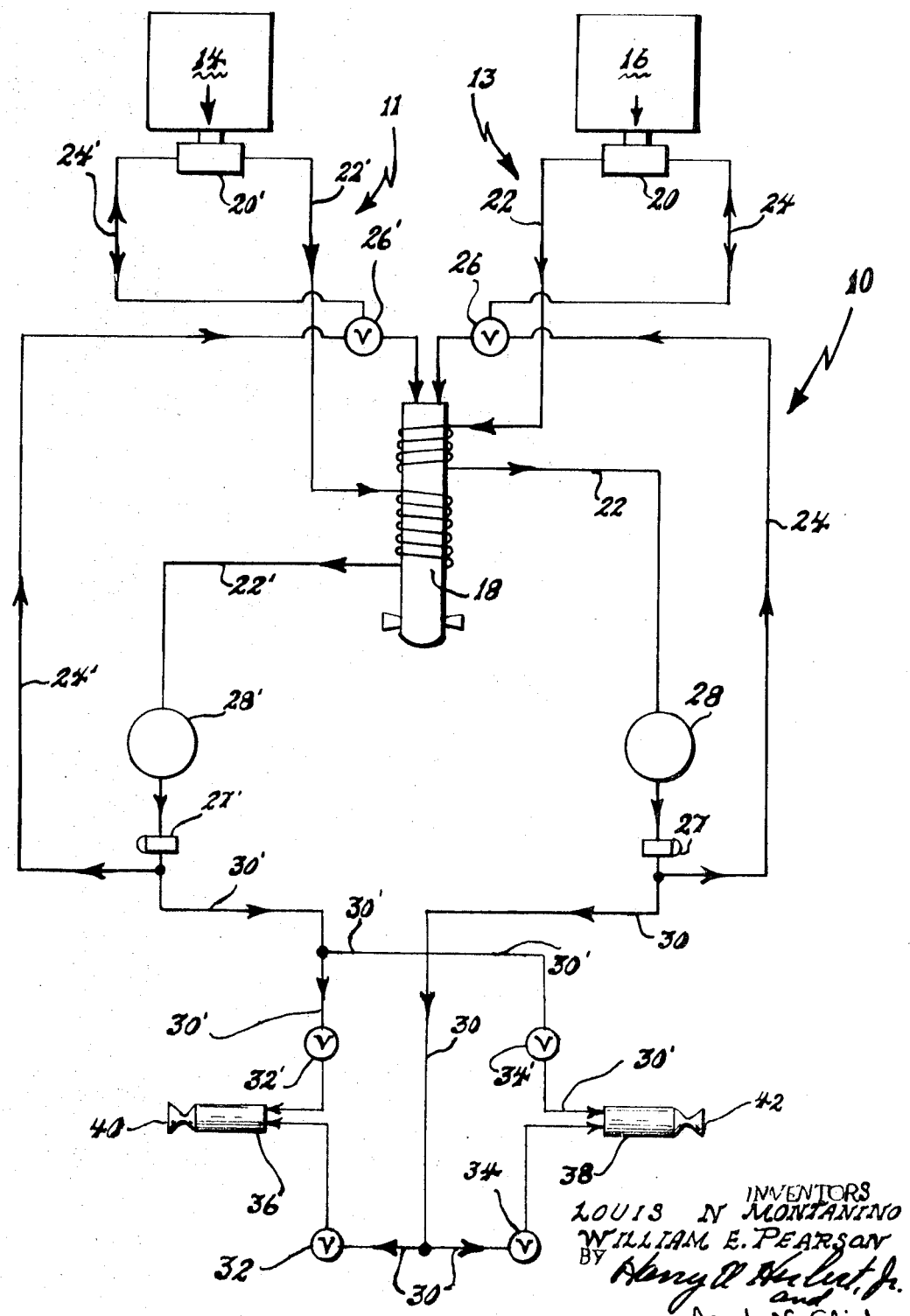

SELF-SUSTAINED ATTITUDE CONTROL SYSTEM

BACKGROUND OF THE INVENTION

This invention relates generally to a propellant feed system, and more particularly to a self-sustaining propellant feed system to supply a secondary hot gas injection control system or auxiliary attitude control rockets.

Various systems for controlling the attitude of a missile or rocket by thrust-vectoring techniques have been developed. These can be divided into three main types: First, there is the mechanical system, which includes such apparatus as swiveling or rotating nozzles, jetevators and similar apparatus, whereby mechanical movement the thrust of the rocket is redirected. Second, there is the injection system which includes such methods as injecting a gas or liquid into the rocket nozzle, whereby a side force is generated. A third method of controlling the attitude of a missile or rocket is by an attitude control system utilizing numerous strategically placed small auxiliary rockets.

Control means with which we are most familiar are of the first type and usually utilize ailerons, vanes and the like, which pivot or rotate in response to a signal from the guidance system should the missile deviate from its proper course. These ailerons or vanes interact with either the fluid through which the missile is traveling or interact with the missile propulsion fluid jet. Control means which interact with the missile propulsion jet cause a deflection of this jet from its normal path during a control signal. The major disadvantage with such a control means, however, is that it may fail to function properly when subjected to erosion or thermal expansion or jamming of moving parts occurring as a result of entrained solids or as a result of heat generated by normal missile flight and propulsion system operation.

In order to overcome this disadvantage, those skilled in the art have searched for method and means to control missile flight without use of moving vanes or mechanical deflectors. This work has included injection of a secondary fluid within the rocket nozzle to deflect the propulsion jet, or an auxiliary attitude control system utilizing a plurality of strategically placed reaction means.

A general understanding of the effects of such a secondary injection can be obtained by referring to a convergent-divergent, or DeLaval-type nozzle. It will be assumed that conditions are such that aft of the nozzle throat the primary flow of exhaust gas is in the supersonic region. When the flow adjacent to the nozzle wall is disturbed by the injection of a gas or liquid to such an extent that the boundary layer separates from the surface, a shock wave will be generated which will propagate outwardly from the wall. As the exhaust gas passes through this shock wave, it is deflected, and a side force is generated which is proportional to the angular deflection of this exhaust gas. This shock wave side force plus the side force caused by the reactive effect of the injected gas itself combine to give the total side force. Viewed in another light this shock wave effect can be considered as an "amplification" of the reactive side force. The attitude control system utilizing auxiliary attitude control rockets strategically locates such reaction means adjacent the main nozzle. The appropriate auxiliary rockets are actuated when it is necessary to deviate the direction of the rocket or space vehicle. Such a system has been found to be more desirable than the secondary injection system, although both are superior to the mechanical system set forth above.

The systems heretofore in use for secondary injection and auxiliary rockets, however, are not capable of sustaining themselves. Furthermore, these systems fall short in that high storage pressures are required. Propellant freezing and boiling, overpressure during the thrust chamber start transient, slow response and reduced specific impulse are also common shortcomings of the systems heretofore in use.

SUMMARY OF THE INVENTION

The propellant feed system of the instant invention eliminates substantially all of the above problems. The system of this invention has higher performance while maintaining the same low-weight advantages of liquid propellant systems. As compared to a high storage pressure superheated gas system, the subject invention allows operation at lower pressure which results in less weight and space envelope requirements, and minimizes gas leakage problems. This type of system allows operation of thrust chambers at higher chamber pressure as compared to a phase conversion system of comparable weight and not utilizing a liquid propellant pump.

The instant invention has its main utility in an attitude control system with propellants identical to the main vehicle propellants. This allows maximum vehicle performance by full utilization of onboard propellants. However, it also has the flexibility of design as an attitude control system with propellants different from the main propellants.

The propellant feed system of this invention, (1) extracts liquid propellants (oxidizer and fuel) from storage tanks (which may be the main vehicle propellant tanks) by means of differential area positive displacement pumps actuated by superheated vapors stored in accumulators; (2) vaporizes and superheats the propellants in heat exchangers; and (3) stores the superheated vapors in said accumulators subsequent to and during use for attitude thrust chamber demand, and positive displacement pump actuation for accumulator replenishment. The heat source for the liquid to gas phase conversion of the propellants in said heat exchanger is provided by the burning of the superheated gases expanded from the positive displacement pump during the liquid propellant suction stroke. Control of the superheat gases from the accumulators is accomplished with pressure regulators and three-way valves. Demand for phase conversion is accomplished automatically within prescribed limits by means of pressure switch controls located on the accumulators.

The primary object of this invention is to provide a self-sustaining propellant feed system to supply propellants to auxiliary attitude control rockets.

It is another object of this invention to provide a propellant feed system which has low operating pressure and therefore minimizes gas leakage and weight problems.

It is a further object of this invention to provide an injection system which can be utilized as a secondary injection system in a thrust-vector control system.

It is still another object of this invention to provide an injection system which is economical to produce and which utilizes conventional, currently available components that lend themselves to standard mass production manufacturing techniques.

For a better understanding of the present invention together with other and further objects thereof, reference is had to the following description taken in connection with the accompanying drawing.

DESCRIPTION OF THE DRAWING

The only FIGURE of the drawing represents a schematic diagram of the propellant feed system of this invention in conjunction with small auxiliary thrust chambers for attitude control.

DESCRIPTION OF THE PREFERRED EMBODIMENT

Referring to the only FIGURE of the drawing, the present invention discloses a propellant feed system 10 for use as a reaction attitude control system in a rocket or space vehicle primarily of the type having a compartment for housing and burning a vaporized liquid propellant and rearwardly directed nozzles 40 and 42. The propellant, comprising of an oxidizer and fuel of the liquid type, is stored within oxidizer storage tank 14 and fuel storage tank 16. These tanks 14 and 16 contain the oxidizer and fuel for the propellant feed system 10 of this invention. It should be noted, however, that the propellant feed system 10 may have its own oxidizer and fuel if so desired.

Referring again to the FIGURE, it should be noted that the system is divided into two identical sections 11 and 13; section 11 for the oxidizer and section 13 for the fuel, both utilizing the same heat exchanger 18. The detailed description and operation of this invention set forth hereinbelow will, therefore, refer to only one such section, that is section 13. Since section 11 is of the same construction and operation as section 13, the like elements therein are denoted with identical numerals having a prime (') thereafter. Furthermore, it should also be emphasized that the propellant feed system 10 of this invention may utilize any number of storage tanks within the scope of this invention.

Referring now to section 13, adjacent fuel storage tank 16 is any suitable pump such as positive displacement pump 20. Pipeline 22 connects pump 20 to heat exchanger 18 and to the entrance of accumulator 28, while line 24 connects pump 20 by way of any suitable three-way valve 26 to heat exchanger 18, pressure regulator 27 and accumulator 28. Another pipeline 30 connects accumulator 28 by way of pressure regulator 27 to valves 32 and 34. Valves 32 and 34 regulate the flow of gas into either left attitude control thrust chamber 36 or right attitude control thrust chamber 38 in which it burns with gaseous propellant from line 30' before being exhausted through either nozzle 40 or 42, respectively, for attitude control.

The system 10 extracts the fuel from storage tank 16 by means of the differential area positive displacement pump 20 which is actuated by the superheated vapors stored in accumulator 28. The system 10 further vaporizes and superheats the extracted fuel in heat exchanger 18 and stores the superheated vapors in accumulator 28 subsequent to and during use for (1) attitude thrust chamber demand, and (2) actuation of positive displacement pump 20. The heat source for the liquid to gas phase conversion of the propellants in heat exchanger 18 is provided entirely by the burning of the superheated gases expanded through line 24 from pump 20 during the liquid propellant suction stroke. When nonhypergolic propellants are used, a temporary electrical charge or the like (not shown) may be used to initiate combustion of the propellants. The control of the superheated gases from the accumulator 28 is accomplished with pressure regulator 27 and valve 26.

MODE OF OPERATION

Initially the oxidizer and fuel accumulators 28 and 28' are charged to operating pressure with appropriate superheated propellant gas vapors. Upon the proper actuation signal, the pressure regulators 27 and 27' pass the superheated vapors therethrough from accumulators 28 and 28' for use in attitude control in the thrust nozzles 40 and 42 and for use in actuation of pumps 20 and 20'.

The gas vapors pass through lines 24 and 24' into the three-way valves 26 and 26' from which they are directed to pumps 20 and 20' through lines 24 and 24' in order to extract propellant to be passed on to heat exchanger 18 through lines 22 and 22'. The expanded superheated gas vapors flow through lines 22 and 22' to accumulator 28 and 28' wherein they are stored for future use.

The heat source for the liquid to gas phase conversion in heat exchanger 18 is provided by the burning of the superheated gases expanded through lines 24 and 24' from pumps 20 and 20' during the liquid propellant suction stroke.

For a system wherein nonhypergolic propellants are used, a temporary electrical charge or the like (not shown) may be used to initiate combustion of the propellants.

Referring again to the gases for the attitude control system of this invention, these gases passing through lines 30 and 30' are regulated by way of valves 32, 32', 34 and 34' to either attitude control thrust chamber 36 or 38. The oxidizer and fuel are combined and burned in thrust chamber 36 or 38 and are exhausted through either nozzle 40 or 42 in such a manner as to control the attitude of the rocket or space vehicle. The system 10 is completely self-sustaining and is capable of acquiring its propellants from either the main propellant tanks 14 and 16 of the space vehicle or from auxiliary propellant tanks.

Although the invention has been described with reference to a particular embodiment, it will be understood to those skilled in the art that the invention is capable of a variety of alternative embodiments within the spirit and scope of the appended claims.

What is claimed is:

1. An attitude control system comprising at least one propellant tank, a pump to said tank, a heat exchanger and an accumulator, a first means connecting one end of said pump to said heat exchanger and to the entrance end of said accumulator, a second means connecting the other end of said pump to said heat exchanger and to the exit end of said accumulator, whereby gases extracted from said accumulator are directed by said second connecting means to actuate said pump, with the expanded gases from said pump further directed by said second connecting means to said heat exchanger to provide a heat source therefor, and a third means connecting the exit end of said accumulator to at least one nozzle, whereby superheated gases from said heat exchanger are directed by said first connecting means to the entrance end of said accumulator and said third connecting means directs gases from the exit end of said accumulator into and out of said nozzle for attitude control.

2. An attitude control system as defined in claim 1 wherein a three-way valve is located in said second connecting means between said pump, said heat exchanger and said accumulator.

3. An attitude control system as defined in claim 2 wherein said pump means is a positive displacement pump.

4. An attitude control system as defined in claim 3 wherein a pressure regulator is located adjacent said exit end of said accumulator.